US011206770B1

(12) United States Patent
Cohn (10) Patent No.: US 11,206,770 B1
(45) Date of Patent: Dec. 28, 2021

(54) ROOT-ZONE CLUSTERING

(71) Applicant: David L. Cohn, Ojai, CA (US)

(72) Inventor: David L. Cohn, Ojai, CA (US)

( * ) Notice: Subject to any disclaimer, the term of this patent is extended or adjusted under 35 U.S.C. 154(b) by 549 days.

(21) Appl. No.: 16/110,118

(22) Filed: Aug. 23, 2018

Related U.S. Application Data

(60) Provisional application No. 62/549,041, filed on Aug. 23, 2017.

(51) Int. Cl.
*A01G 17/00* (2006.01)
*A01G 9/20* (2006.01)
*A01G 17/06* (2006.01)

(52) U.S. Cl.
CPC ............. *A01G 17/005* (2013.01); *A01G 9/20* (2013.01); *A01G 17/06* (2013.01)

(58) Field of Classification Search
CPC .... A01G 17/005; A01G 17/02; A01G 17/065; A01G 17/06
USPC ................................. 47/4, 58.1 FV
See application file for complete search history.

(56) References Cited

U.S. PATENT DOCUMENTS

2015/0272015 A1* 10/2015 Sowinski ............... A01G 17/06
47/46

FOREIGN PATENT DOCUMENTS

WO    WO-2020032817 A1 *  2/2020  ............. A01G 17/02

* cited by examiner

*Primary Examiner* — Monica L Barlow
(74) *Attorney, Agent, or Firm* — Oblon, McClelland, Maier & Neustadt, L.L.P.

(57) ABSTRACT

A method and system for managing bearing plants so that their belowground root-zones are clustered together to improve water-use effectiveness; and training their aboveground structures such that their aboveground structures have the wider spacing they require. It is applicable to plants (e.g., vine-like plants including wine grapes) whose trunks can be oriented at an angle other than vertical or which can be otherwise shaped so that their canopies are not centered above their root-zones but rather are horizontally offset from the root-zones.

21 Claims, 12 Drawing Sheets

ROOT-ZONE CLUSTERING

BACKGROUND OF THE INVENTION

Field of the Invention

The present invention relates generally to cultivation of bearing plants and, more particularly, to a method of locating and training bearing plants that improves the yield produced by those plants for a given amount of available water and that offers other benefits.

Description of the Related Art

Humans have cultivated crops for all of recorded history, and frequently have used irrigation to supplement naturally available water. It is not surprising, then, that there are many ways to assess how well water is used. For irrigation systems, measures typically focus on the fraction of irrigation water that is, in some sense, made useful to the plant. For example, civil engineers, who design irrigation systems, have defined Irrigation Efficiency as the ratio of the volume of water that is beneficially used to the volume of irrigation water applied.

For farmers, the phrase "beneficial use" primarily means making water available to the roots of plants that produce a crop. In this case, the civil engineer's definition of Irrigation Efficiency can become the fraction of irrigation water that enters the crop's root-zone. (The root-zone refers to a volume of soil surrounding the roots of plants from which the plants draw water and nutrients.) These are both proportional measures that identify the useful portion of the water.

Plant scientists are concerned with the overall functioning of a plant, not with that of an irrigation system. They understand that putting water in the root-zone is only the beginning. The plant must then use the water properly. Therefore, they consider water-use efficiency, which can mean the fraction of water that is absorbed by roots of plants and used by those plants in metabolic process compared to that fraction lost to transpiration.

These two views have been combined to provide a third meaning to the term Irrigation Efficiency. That is, Irrigation Efficiency can mean the ratio of the amount of water consumed by the plants to the amount of water supplied through irrigation.

Each of these definitions concerns only the percentage of available water used by the plant. None measures how effectively the plant uses the water to produce a crop. (For example, a plant given too little water could have a high Irrigation Efficiency but yield nothing.) A more useful metric would measure how well the available water—both irrigation and natural—is used to produce a crop. It would encourage methods that improve the effectiveness with which the plants use available water to produce yield.

Traditionally, the desired structure of large plants that produce perennial crops is determined both by natural elements (including appropriate exposure to sun, proper air flow, topography, yield concerns) and by cultural practices (including needs of maintenance, pruning, harvesting, mechanization). These factors relate primarily to the aboveground portion of the plant that includes the canopy and the trunk. The natural elements determine a desired size for the canopy and the cultural practices specify access requirements. Together, they result in preferred arrangements of the plants.

The desired structure is created according to a plant management method. The method begins by first locating the seeds or young plants from which the mature plants will grow. Known plant management methods frequently specify the locations for these seeds or young plants as the centers of the desired spaces to be occupied by the aboveground portions of the mature plants.

After the seeds or young plants begin to grow, the root-zones develop naturally below ground. They are more or less centered under the original plant locations.

As the above ground portions of the plants grow, the plant management method describes how to train them into the desired structure. Training can include devices to guide the plants into position and pruning to shape the plants. Some training devices are only used during the plants' formative stages; others remain for the life of the plants. Pruning entails removing selected portions of the plant at appropriate times of the year and proper phases of the plant's life. For example, during the summer of a young grapevine's first year of growth, only one shoot is allowed to grow from its roots; the others are removed. This shoot becomes the vine's trunk. Also, during the winter, much of the canopy of a mature grapevine is removed leaving only a few canes (shoots trimmed to 2-4 feet) or a desired number of spurs (shoots trimmed to 2-4 inches). The remaining canes or spurs become the basis for the vine's canopy during the next growing season. The training method can either locate the center of the canopy essentially over the original plant location or it can horizontally offset it from that location.

According to typical methods, such plant locations are normally equally spaced in substantially straight rows. The plants may also require training support systems such as trellises, which typically work well in straight rows. According to such methods, the interplant separation within the row provides sufficient space for each plant's canopy and the typically broader spacing between rows is wide enough to accommodate plant management equipment. Such a single curtain structure allows the plants to be maintained by equipment on both sides of the row. Alternatively to a single curtain structure, sometimes a double-row structure is used with pairs of rows fairly close together; only the spacing between the pairs is wide enough for the equipment. In this double-row (or double curtain) structure, each row can only be worked on one side.

Figure 1:
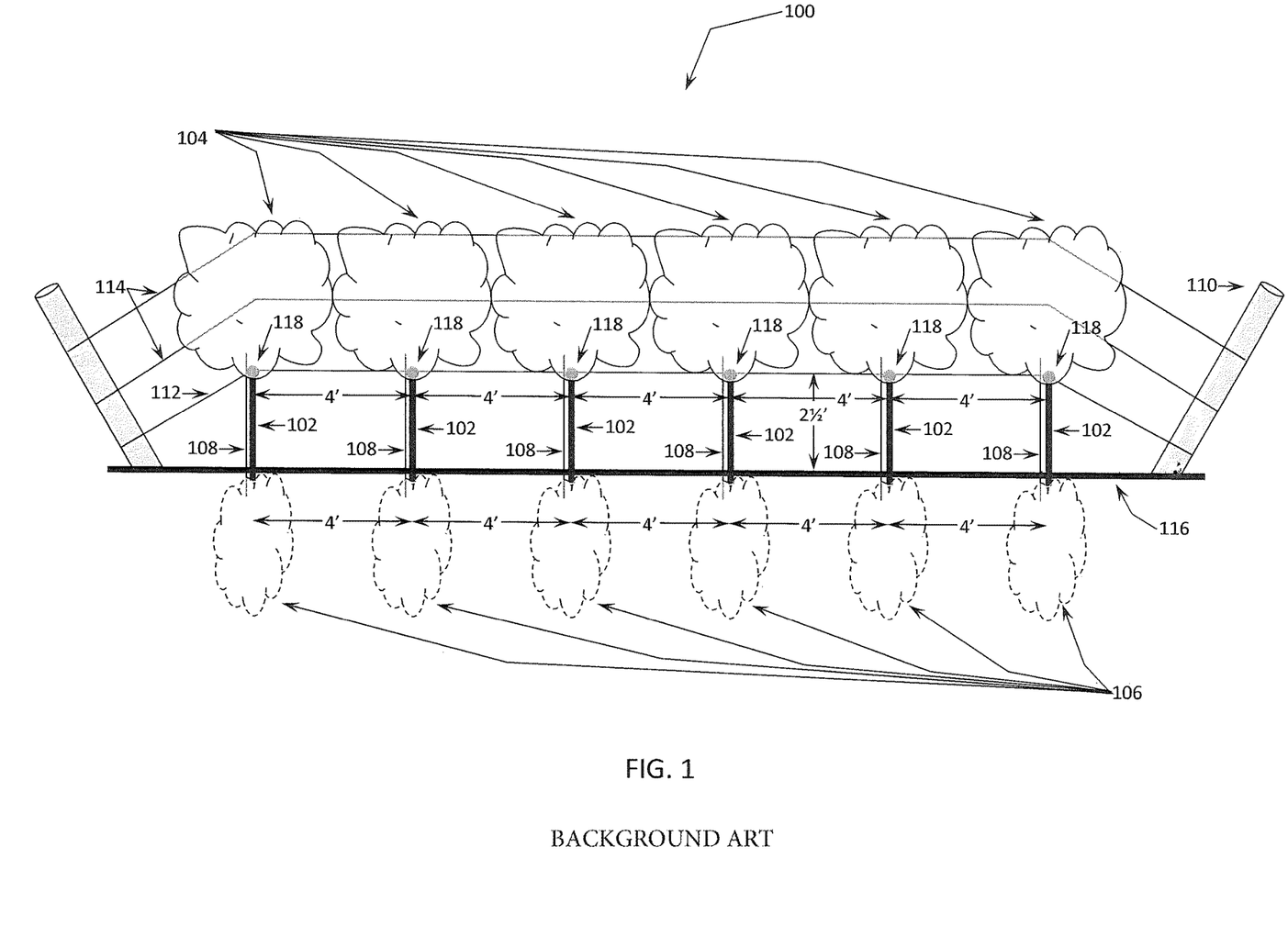
FIG. 1 illustrates a side view of a conventional row spacing of a vineyard.

An example of the conventional single-row structure is shown in FIG. 1. The figure depicts one row of a fairly dense wine grape vineyard 100 with four-foot interplant spacing (i.e., spacing between adjacent vine trunks 102 in the same row) and six-foot inter-row spacings (i.e. the spacing between adjacent rows.) The inter-row spacing is not shown in FIG. 1. Other interplant spacings and inter-row spacings are also are known. As the figure shows, each plant's trunk 102 (which connects the canopy 104 to the belowground root-zone 106) has been trained to be essentially vertical by a training rod 108 (e.g., a four-foot ¼" steel rod anchored in the ground 116). With a vertically trained trunk 102, the root-zone 106 is centered below the canopy 104, and the interplant spacing determined by aboveground factors coincides with the distance between the root-zone centers. The figure also sketches a vertical shoot positioning (VSP) trellising system 114 supported by end posts 110 into which the vines are trained. The lower horizontal wire (the fruiting wire 112) defines the tops of each trunk 102 (also referred to as the head 118 of each vine). These heads are also 4 feet apart, and set the trunk length at about 2½ feet (i.e., distance from trunk head 118 to ground 116). Additional trellis wires guide the canopy into shape. For vineyards that use irrigation, there is typically an irrigation wire below the fruiting wire. FIG. 1 does not show an irrigation wire. This wire normally supports an irrigation tube with a drip emitter installed essentially over the center of each root-zone. The emitter flow rates are selected to assure proper water use effectiveness based on climate, plant variety & maturity, soil composition and other factors.

Figure 11:
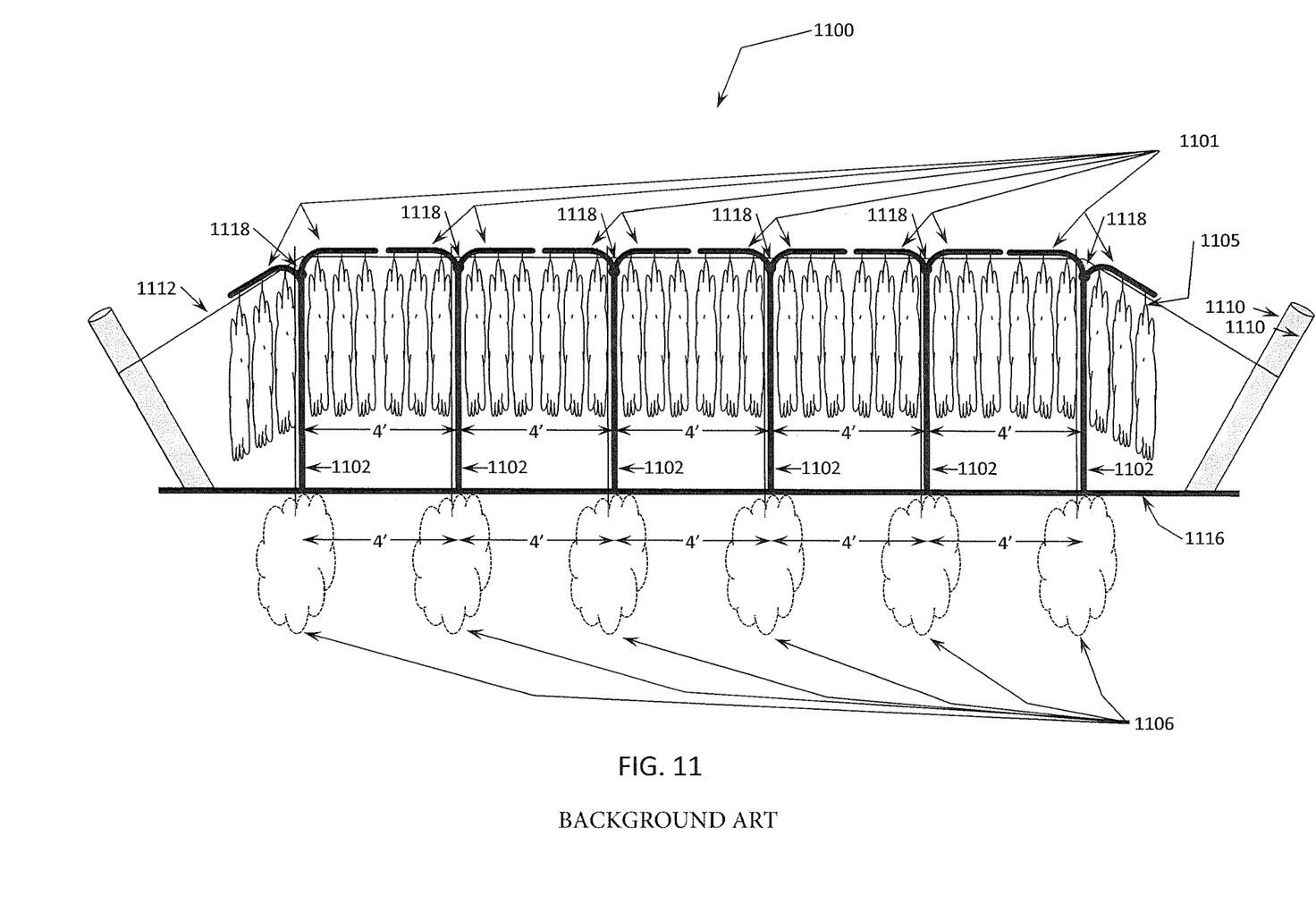
FIG. 11 illustrates a side view of a conventional row trained to a double-sided cordon with spur pruning using a Casarsa training method.

A second example of a conventional single-row structure is shown in FIG. 11. The figure depicts one row of a vineyard 1100 with the same plant density as FIG. 1 but which uses the known Casarsa training method. Here, the vines have been trained into a double-sided cordon structure along a fruiting wire 1112 and the cordons have been spur pruned. The cordons 1101 are horizontal extensions of the trunks 1102 along the fruiting wire 1112, and the spurs 1105 grow downward from the fruiting wire and no trellis wires are used. With this known method, the center of the canopy of each vine is directly above the center of its root-zone 1106. Hence, just as with the method which produced the structure depicted in FIG. 1, the distance between the root-zone centers of nearby vines is essentially the same as that between their respective canopy centers.

Figure 9:
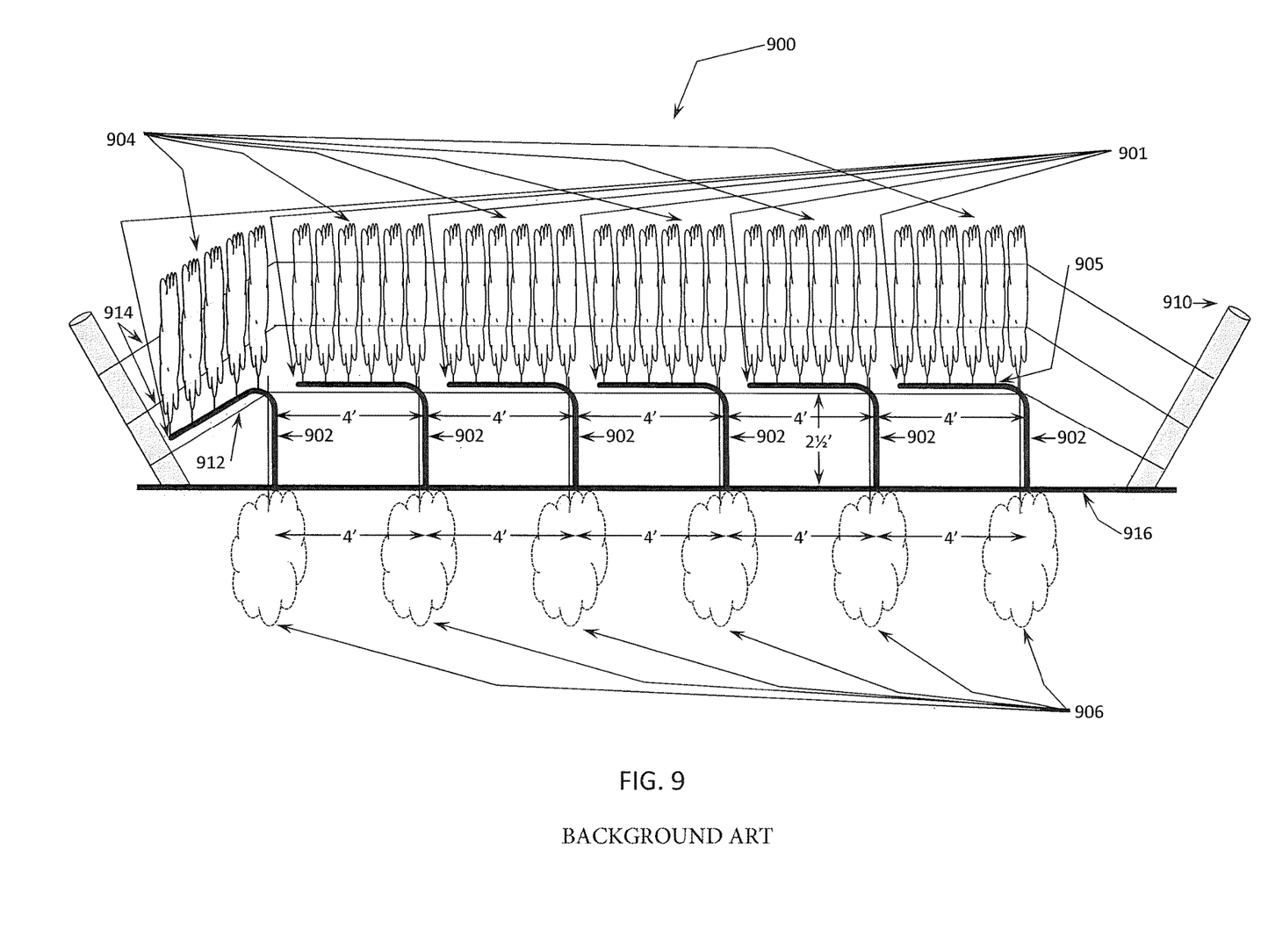
FIG. 9 illustrates a side view of a conventional row trained to a single-sided cordon with spur pruning using a vertical shoot positioning training with trellis wires.

A third example of a conventional single-row structure is shown in FIG. 9. The figure also depicts one row of a vineyard 900 with the same plant density as FIG. 1 but with a different training method. Here, the vines have been trained into a single-sided cordon structure, and each year, the cordons are spur pruned. The cordons 901 are horizontal extensions of the trunks 902 along the fruiting wire 912, and the spurs 905 grow into vertical shoots that that are trained into the trellis to form the canopy 904. With this known method, the center of the canopy of each vine is horizontally offset from the center of its root-zone. However, each vine is offset in the same direction so, just as with the method which produced the structure depicted in FIG. 1, this method produces a structure where the distance between the root-zone centers of nearby vines is essentially the same as that between their respective canopy centers.

Figure 6:
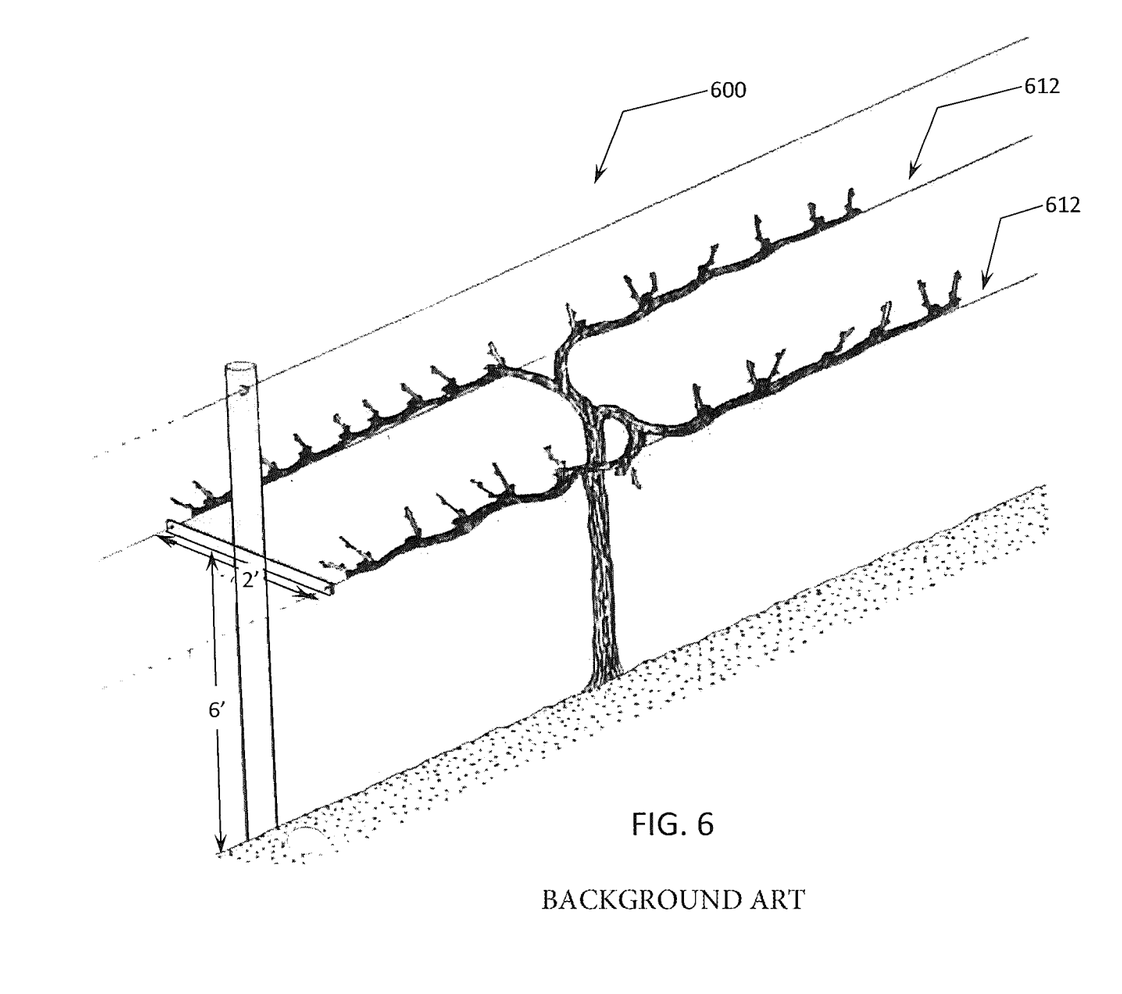
FIG. 6 illustrates a conventional Lyre double curtain arrangement.

Another known row-oriented structure is the Geneva Double Curtain (GDC) training structure. Geneva Double Curtain is produced by a vine-training method where the canopy of individual vines is divided in two with each side trained downward from high fruiting wires as parallel pendent curtains. Another example of a double curtain structure is that produced by the Lyre training method. This structure depicted in FIG. 6. With Lyre, the canopy of each vine is divided in two with the sides separated by about two feet. Each side is trained along a horizontal fruiting wire 612, and unlike GDC, the shoots are trained upward as in VSP. Each side of the row is maintained separately.

These known methods produce structures that suffer from a number of problems, such as ineffective use of water. Accordingly, there is a need for improved methods that produce vineyards where the effectiveness with which the plants use available water to produce yield is increased.

SUMMARY OF THE INVENTION

According to a first aspect, a plant management method is provided. The plant management method includes locating a first plant and a second plant. The first plant grows to include a first root-zone and a first canopy and the second plant grows to include a second root-zone and a second canopy. The first and second plants are then trained to horizontally offset the centers of their respective canopies from the centers of their respective root-zones. The offsets are such that a center of the first canopy and a center of the second canopy are the respective centers of the desired spaces to be occupied by the aboveground portions of the mature plants and that these centers are further from each other than a center of the first root-zone and a center of the second root-zone are to each other.

In some embodiments, a distance between the centers of the first and second root-zones is less than half a distance between the centers of first and second canopies, and in some embodiments less than a third or less than a fourth of the distance between the centers of first and second canopies. In some embodiments, a distance between the centers of first and second root-zones is less than one foot (or less than six inches). In some embodiments, the first and second root-zones are close enough that a single drip emitter can effectively irrigate both plants. In this case, the root-zones are said to substantially overlap.

According to a second aspect, a plant management method is provided. The plant management method includes planting a first row of plants having a first plant and a second plant; installing a first end-post, a second end-post and a fruiting wire. The fruiting wire extends between the first end-post and the second end-post. The first plant grows to include a first canopy and a first root-zone, and the second plant grows to include a second canopy and a second root-zone. The first and second plants are then trained to horizontally offset the centers of their respective canopies from the centers of their respective root-zones. The offsets are such that a center of the first canopy and a center of the second canopy are the respective centers of the desired spaces to be occupied by the aboveground portions of the mature plants and that these centers are further from each other than a center of the first root-zone and a center of the second root-zone are from each other.

In some embodiments, a distance between the centers of first and second root-zones is less than half a distance between the centers of first and second canopies, and in some embodiments less than a third or less than a fourth of the distance between the centers of first and second canopies. In some embodiments, a distance between the centers of first and second root-zones is less than one foot (or less than six inches). In some embodiments, the first and second root-zones substantially overlap.

According to a third aspect, a plant management method is provided. The plant management method includes planting a first row of plants having a first plant and a second plant; installing a first end-post, a second end-post, a trellis wire and a fruiting wire. The trellis wire and the fruiting wire extend between the first end-post and the second end-post. The first plant grows to include a first canopy and a first root-zone, and the second plant grows to include a second canopy and a second root-zone. The first and second plants are then trained to horizontally offset the centers of their respective canopies from the centers of their respective root-zones. The offsets are such that a center of the first canopy and a center of the second canopy are the respective centers of the desired spaces to be occupied by the aboveground portions of the mature plants and that those centers are further from each other than a center of the first root-zone and a center of the second root-zone are to each other.

In some embodiments, a distance between the centers of first and second root-zones is less than half a distance between the centers of first and second canopies, and in some embodiments less than a third or less than a fourth of the distance between the centers of first and second canopies. In some embodiments, a distance between the centers of first and second root-zones is less than one foot (or less than six inches). In some embodiments, the first and second root-zones substantially overlap.

In some embodiments, the first row of plants further includes a third plant that is located between the first plant and the second plant. The third plant grows to include a third canopy and a third root-zone. The first and second plants are then trained to horizontally offset the centers of their respective canopies from the centers of their respective root-zones. The third plant is trained to center its canopy above the center of its root-zone. The training is such that centers of the respective canopies are at the respective centers of the desired spaces to be occupied by the aboveground portions of the mature plants and that these centers are further from each other than the centers of their respective root-zones are from each other.

In some embodiments, the plant management method further includes planting a second row of plants having a third plant and a fourth plant. As the plants grow to include respective canopies and root-zones, the aboveground portions of these plants are trained to horizontally offset their respective canopies from their respective root-zones. The offsets are such that centers of the canopies are at the respective centers of the desired spaces to be occupied by the aboveground portions of the mature plants and that these centers are further from each other than the centers of their respective root-zones are from each other. In some embodiments, the distance between the pairs of root-zone centers are less than half (or one third or one quarter) the distance between the respective canopy centers. In some embodiments, the distance between the center of any plant's root-zone and the nearest root-zone of another plant is less than one foot (or less than six inches). In some embodiments, the root-zone of each plant substantially overlaps with that of at least one other plant.

According to a fourth aspect, a plant management method includes planting three or more plants located in a relatively close cluster. As the plants grow to include respective canopies and root-zones, the above ground portions of these three or more plants are trained to horizontally offset the centers of their canopies from the centers of their respective root-zones. The offsets are such that centers of the canopies are at the respective centers of the desired spaces to be occupied by the aboveground portions of the mature plants and that these centers are further from each other than the centers of their respective root-zones are from each other.

In some embodiments, the offsets are such that the distance between centers of any two plants' root-zones is less than half the distance between centers of their respective canopies, and in some embodiments less than a third or less than a fourth of the distance between the centers of their respective canopies. In some embodiments, the distance between the center of any plant's root-zone and the nearest root-zone of another plant is less than one foot (or less than six inches). In some embodiments, the root-zone of each plant substantially overlaps with that of at least one other plant.

DETAILED DESCRIPTION OF EXEMPLARY EMBODIMENTS

Embodiments of the present invention use a method of locating and training bearing plants that improves the yield produced by those plants for a given amount of available water and that possibly offers other benefits. This method involves locating those plants so that their belowground root-zones are clustered together to improve water-use effectiveness; and training their aboveground structures such that their canopies have the wider spacing they require. It is applicable to plants whose trunks can be oriented at an angle other than vertical or which can be otherwise shaped so that their canopies are not centered above their root-zones but rather are horizontally offset from the root-zones. It has been found to be particularly effective for vines and vine-like plants including wine grapes.

Embodiments of this invention may be used for relatively large plants that produce perennial crops (such as those harvested from trees, vines, flowers (such as roses), bushes, and the like). Thus, as used herein, "plant" shall be understood also to include trees, vines, flowers and bushes. Embodiments described here utilize plant location and training to enable plants to produce more yield for a given amount of available water. This disclosure, therefore, will employ a term that focuses on a key goal of farming: water-use effectiveness (WUE), which is taken to be the yield produced by a given amount of available water. Unlike the unit-less water-use efficiency metrics, WUE is not an absolute measure. That is, its value can be adjusted simply by redefining the way yield is measured. It is, however, a valuable relative measure; it provides meaningful comparisons between competing ways to manage plants and to use water. When other aspects are kept constant (plant type, yield definition, overall cost, adaptability to mechanization, etc.) WUE data can provide a clear distinction between approaches. Embodiments disclosed here improve water-use effectiveness.

According to one aspect of the invention, the root-zones of multiple plants are clustered to provide an improved growing environment for the roots.

Figure 2:
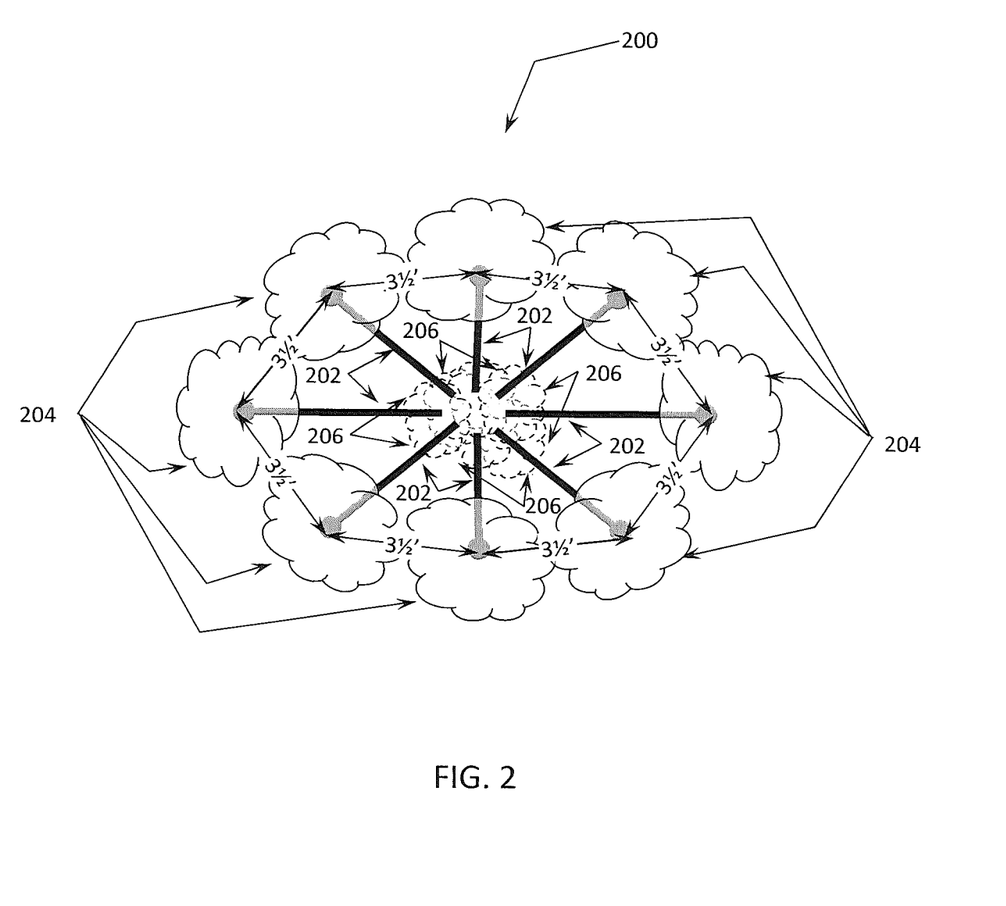
FIG. 2 illustrates a top view of an exemplary eight-vine cluster managed according to embodiments of the present invention.

Experiments have verified that such clustering can significantly improve water-use effectiveness and can provide other benefits. In one example, whose resulting structure is depicted in FIG. 2, the root-zones 206 of eight vine trunks 202, having canopies 204, were clustered with only about 3-6 inches between centers of neighboring root-zones 206. Their canopies were horizontally offset from their respective root-zones by 2-4 feet providing about 3.5 feet between centers of neighboring canopies. These vines were given half as much water per vine as nearby vines planted in conventional rows with four-foot interplant and root-zone center spacing (as described in relation to FIG. 1). The experiment was conducted in a region with no rain during the growing season, so essentially all available water came from irrigation. In order to allow the canopies 204 of the clustered vines adequate room, the trunks 202 were trained to five-foot vertical stakes (not shown) encircling the cluster several feet away. The canopies 204 were developed using an adaptation of Gobelet vine training and no trellis was used. Gobelet vine training is a form of head training favored by the Romans. Traditionally, it has a short trunk (about 1½ feet) topped by a gnarled head. It is spur pruned and the shoots are allowed to droop from the head. The longer trunks and vertical support stake used in this experiment prevented the shoots from reaching the ground.

Figure 3:
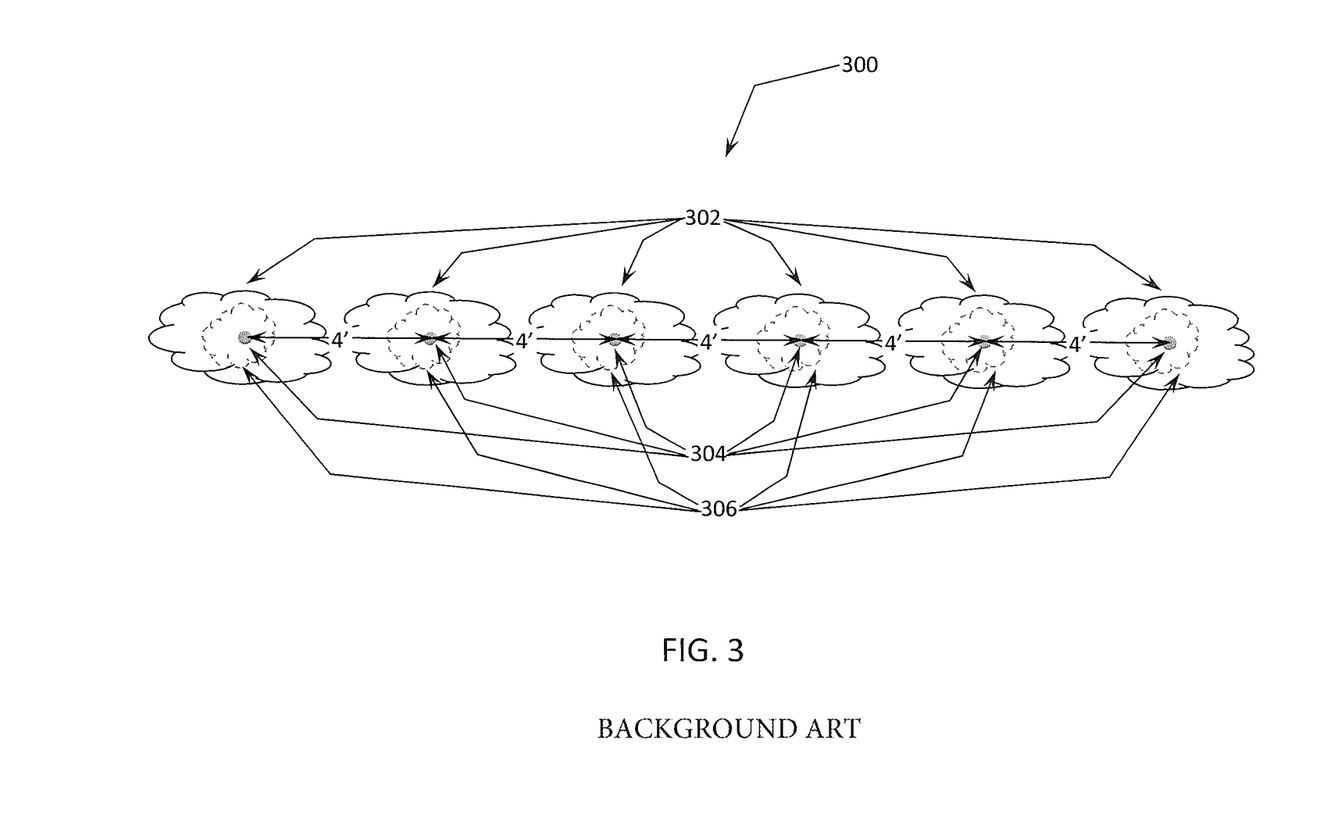
FIG. 3 illustrates a top view of a conventional row spacing of a vineyard.

The vine heads in the clustered configuration were slightly closer than in the traditional rows (3½ feet compared to 4 feet), but the canopies were deeper assuring the vines of adequate sun and airflow. A top view of this configuration is shown in FIG. 2 and is compared to a top view of the traditional row structure in FIG. 3. Despite the significant water availability disadvantage (since the clustered configuration was given half as much water per vine), the clustered vines were substantially more robust and, at the end of the growing season, produced twice as much fruit per vine as the vines in the traditional rows. Thus, the water-use effectiveness for this example improved four-fold.

In addition to the water savings (twice the fruit for half the water), the clustering experiment also demonstrated other apparent advantages. For example, the experiment showed dramatic economy of land use. The total space per vine needed for the cluster, including room to access and maintain the vines, was about half that needed for vines in a traditional row structure. For some wine growing areas, particularly those that produce high quality wine, land cost is a major economic concern.

Wine made from the cluster grapes was preferred in subjective tasting trials to wine made from adjacent grapes grown in a conventional row configuration. Also, in a subsequent year, the cluster grapes suffered only minimal damage from extraordinarily hot weather. The same weather destroyed more than 70% of the crop in conventional rows.

If mechanized farming is desired, however, the cluster structure of FIG. 2 may not be ideal. Modern farm equipment is designed to maintain the canopies of plants spaced uniformly in rows. Some vineyards, such as very small ones and those that produce premium wine grapes, use little, if any, mechanization. For these, the increased effectiveness of water and land use offered by cluster structure of FIG. 2 could be compelling. However, for many other grape vineyards and for producers of other crops who also depend on equipment, mechanization is important. In such circumstances, the cluster configuration of FIG. 2 may be modified so that it is compatible with a single- or double-curtain row layout. That is, root-zone clustering can also be applied to plants whose canopies grow in substantially straight rows. The discussion here focuses on grapes, but the method is applicable to any plant whose trunk and canopy can be managed so that the canopy is horizontally offset from the root-zone. The objective of the offset is to allow replication of the canopy structure of conventional row planting while clustering the belowground root-zones.

Figure 4:
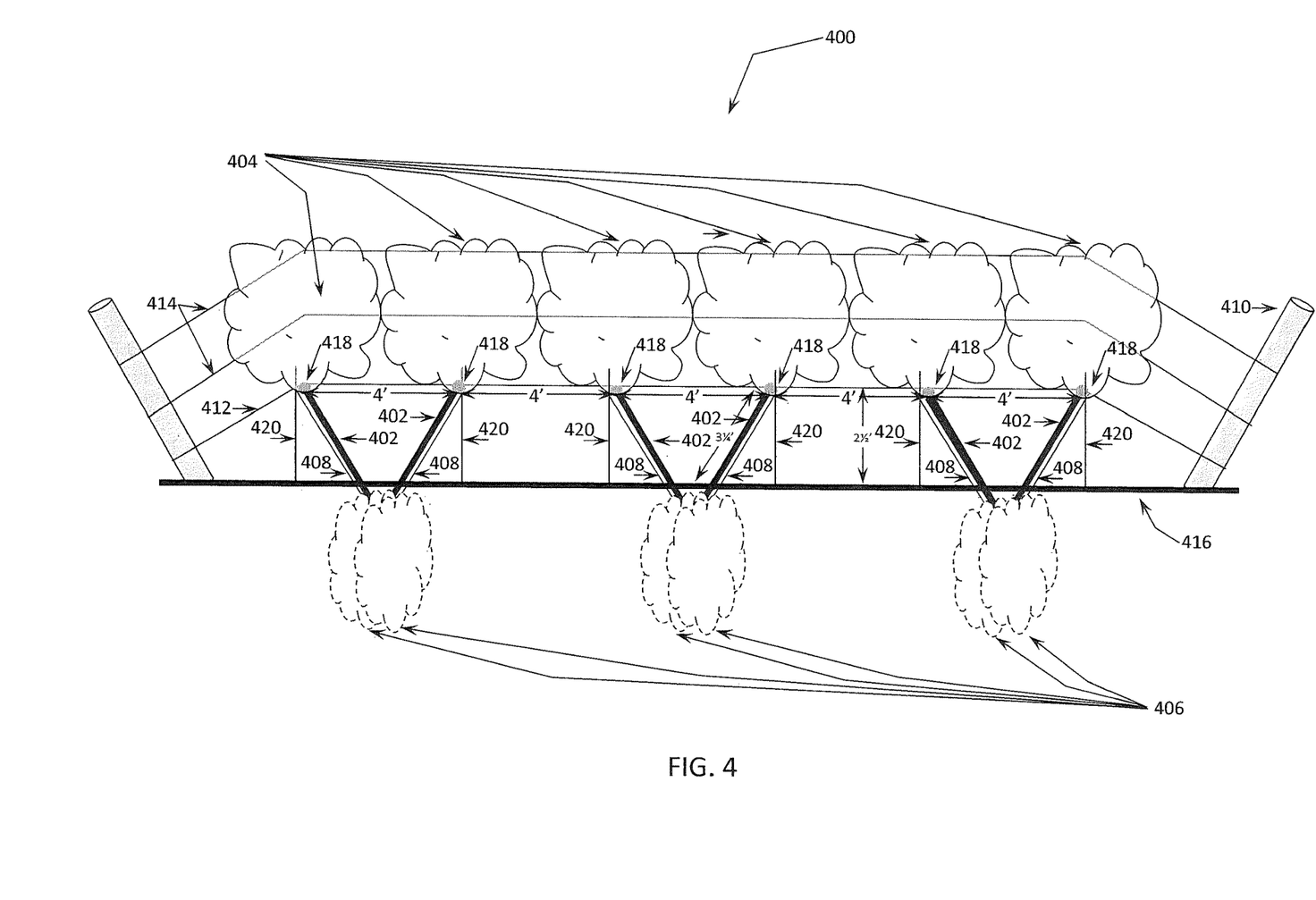
FIG. 4 illustrates a side view of an exemplary two-vine clustered row managed according to embodiments of the present invention.

FIG. 4 illustrates the result of using an exemplary embodiment to create a two-vine clustered row. As shown in FIG. 4, the resulting vineyard 400 includes pairs of grape vines that have been planted with centers of their root-zones 406 a few inches apart. Their trunks 402 have been trained to locate their heads 418 in the same positions as those shown for conventional row planting in FIG. 1. This is done with an angled training rod 408 connected to a vertical support rod 420. As a result, the trunks 402 in the two-vine clustered row are a bit longer (3¼ feet instead of 2½ feet) but the canopies 404 are horizontally offset from the root-zones 406 and have the same location and shape as in a conventional row. Consequently, the same vineyard equipment that would service the canopies in a conventional row would also service those in a clustered row (e.g., VSP trellis 414, fruiting wire 412, and end-posts 410 coupled to the ground 416). The irrigation system for this embodiment can use a single drip emitter for each pair of vines.

Figure 12:
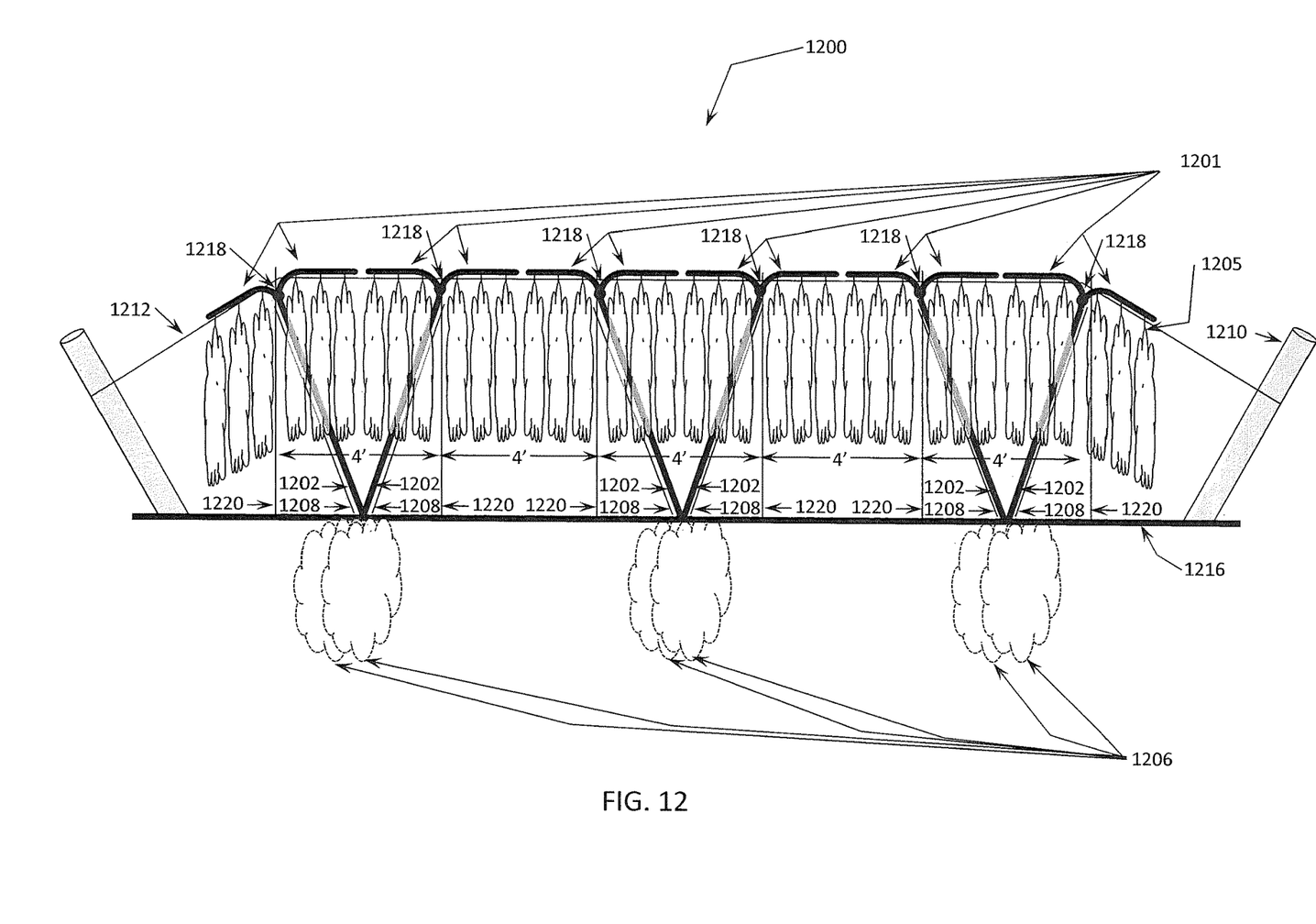
FIG. 12 illustrates a side view of a two-vine clustered row trained to a double-sided cordon with spur pruning managed according to embodiments of the present invention.

FIG. 12 illustrates the result of an exemplary embodiment to produce a two-vine clustered row using the known Casarsa training method. As shown in FIG. 12, vineyard 1200 includes pairs of grape vines that have been planted with centers of their root-zones 1206 a few inches apart. Their trunks 1202 have been trained to locate their heads 1218 in the same positions as those shown for conventional row planting in FIG. 11. This is done with an angled training rod 1208 connected to a vertical support rod 1220. As a result, the trunks 1202 in the two-vine clustered row are a bit longer but the canopies are offset from the root-zones 1206 and have the same location and shape as in a conventional row using the Casarsa training method. Consequently, the same vineyard equipment that would service the canopies in a conventional Casarsa row would also service those in a clustered row (e.g., no trellis wire, fruiting wire 1212, and end-posts 1210 coupled to the ground 1216).

Figure 5:
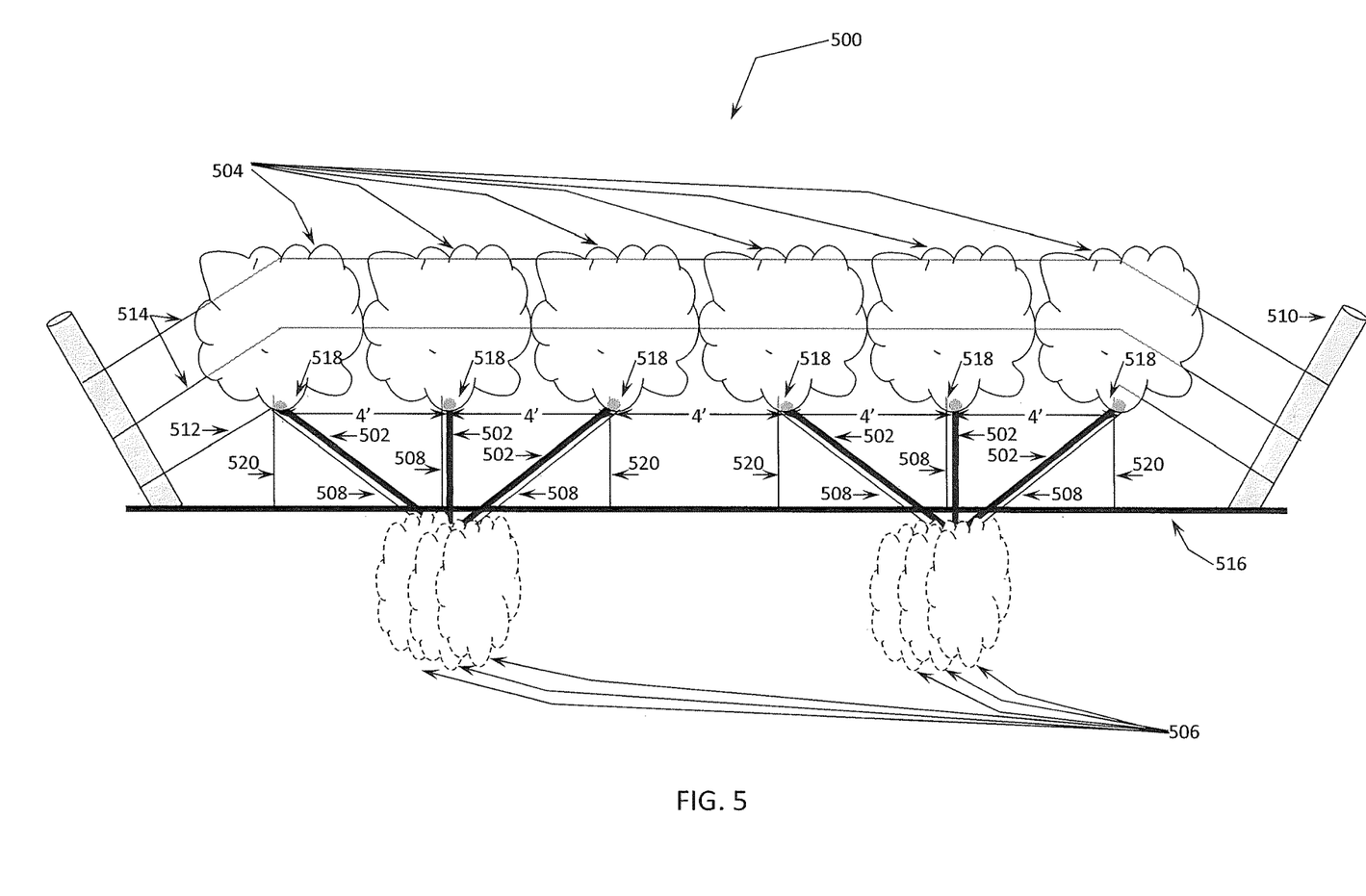
FIG. 5 illustrates a side view of a three-vine clustered row managed according to embodiments of the present invention.

FIG. 5 illustrates the result of an exemplary embodiment to produce a three-vine clustered row, which extends the two-vine cluster of FIG. 4 to a three-vine cluster. That is, three vines are planted close together. The reference numbers in FIG. 5 may denote similar structure to that of FIG. 4. For example, the vines are trained with training rods 508. Due to the geometry, though, the center vine is trained vertically using a training rod 508 that is smaller (e.g., 4 feet long) than the training rod 508 used for the outer two vines (e.g., about 6 feet long). To maintain the four-foot vine head spacing, the center vine trunks are shorter (e.g., about 2½ feet) than the outer trunks (e.g., over 4½ feet). As in the two-vine cluster, the centers of the three clustered root-zones 506 are a few inches apart and the canopies are offset to be 4 feet apart. The irrigation system for this embodiment can use a single drip emitter for each group of three vines.

Figure 10:
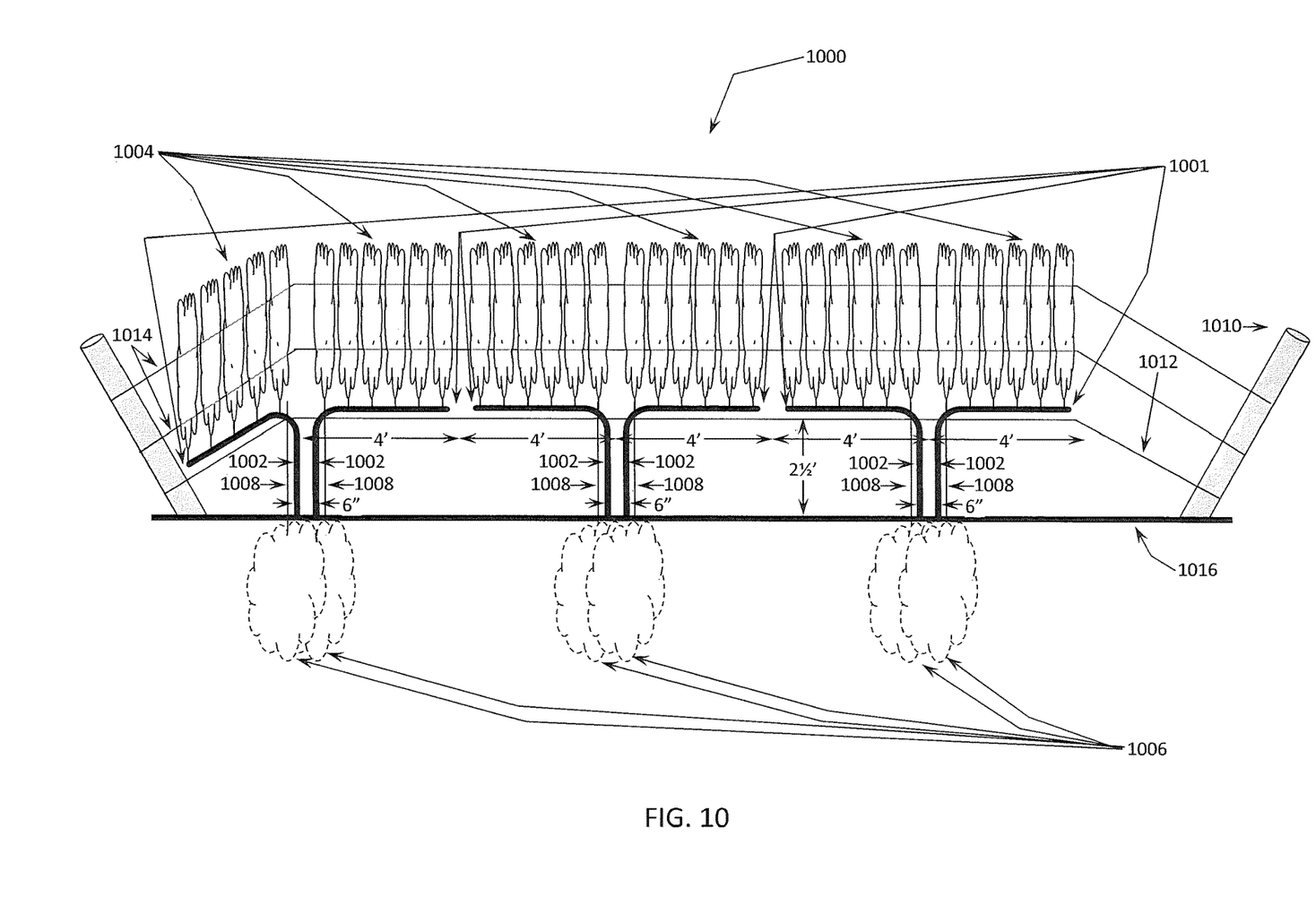
FIG. 10 illustrates a side view of a two-vine clustered row trained to single-sided cordon with spur pruning according to embodiments of the present invention.

FIG. 10 illustrates the result of using a second exemplary embodiment to create a two-vine clustered row, this one trained with single-sided cordon that uses spur pruning. As shown in FIG. 10, vineyard 1000 includes pairs of grape vines that have been planted with centers of their root-zones 1006 a few inches apart. The cordons 1001 of adjacent vines have been trained in opposite directions so their spurs are in the same positions as those shown for conventional row planting with cordon training in FIG. 9. This is done with pairs of vertical training rods 1008 placed close together. As a result, the trunks 1002 and cordons 1001 in the two-vine clustered row with cordon training are similar in size and shape to those in FIG. 9, but the centers of the canopies 1004 are offset from the root-zones 1006 and have the same location and shape as in a conventional row. Consequently, the same vineyard equipment that would service the canopies in a conventional row would also service those in a clustered row (e.g., VSP trellis 1014, fruiting wire 1012, and end-posts 1010 coupled to the ground 1016). The irrigation system for this embodiment can use a single drip emitter for each pair of vines.

Figure 7:
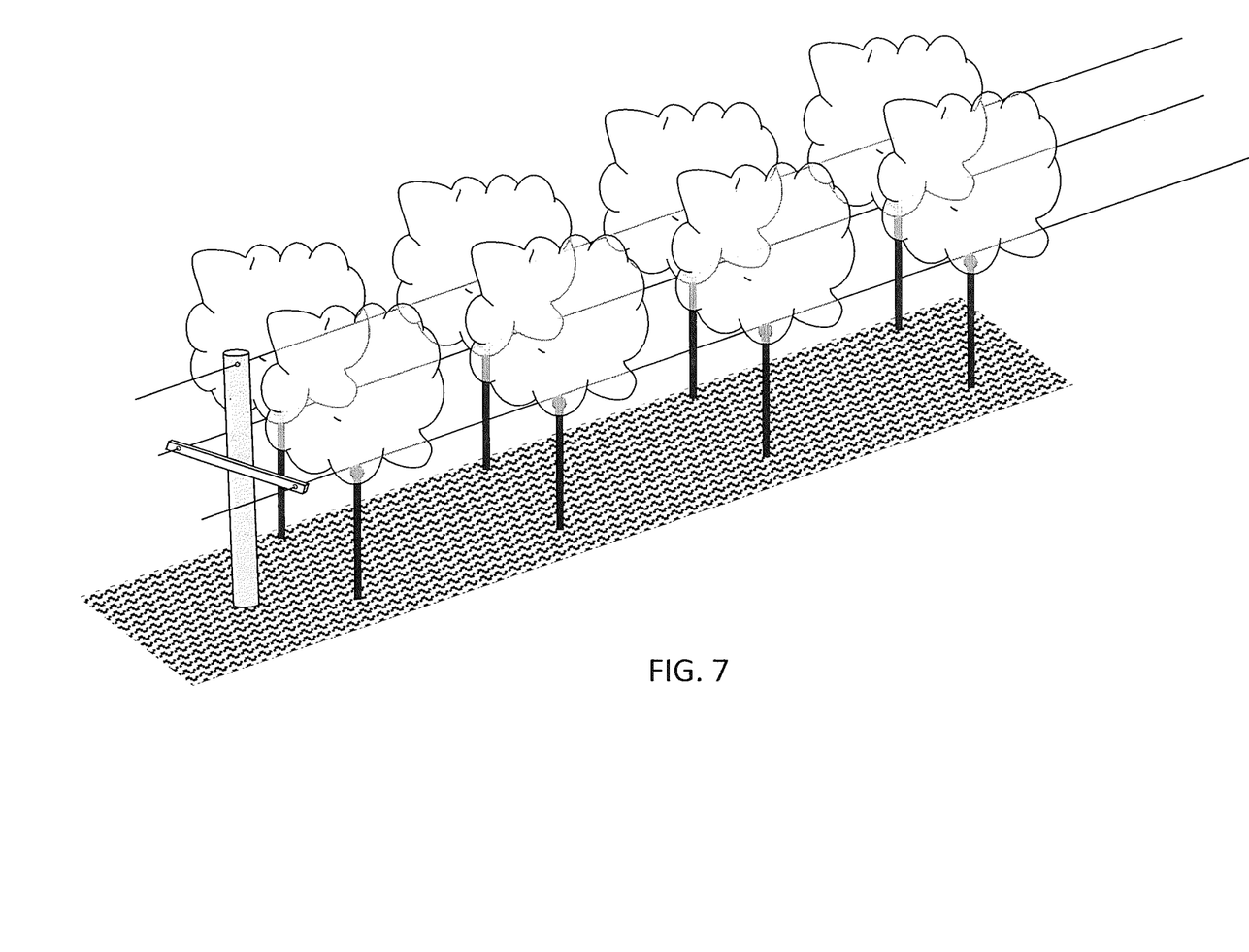
FIG. 7 illustrates a modified double curtain arrangement.

Another row-oriented vineyard form created by using an embodiment of the invention resembles the double curtain approach. In order to explain how this approach can be adopted for the invention, we begin with an intermediate explanatory step. FIG. 7 shows a known double-curtain training system based on two closely parallel rows of vines with about two feet between rows. Here the canopies of individual vines are positioned like the vine sides in Lyre. These canopies would be trained with VSP and, as with Lyre, maintained from only one side.

Figure 8:
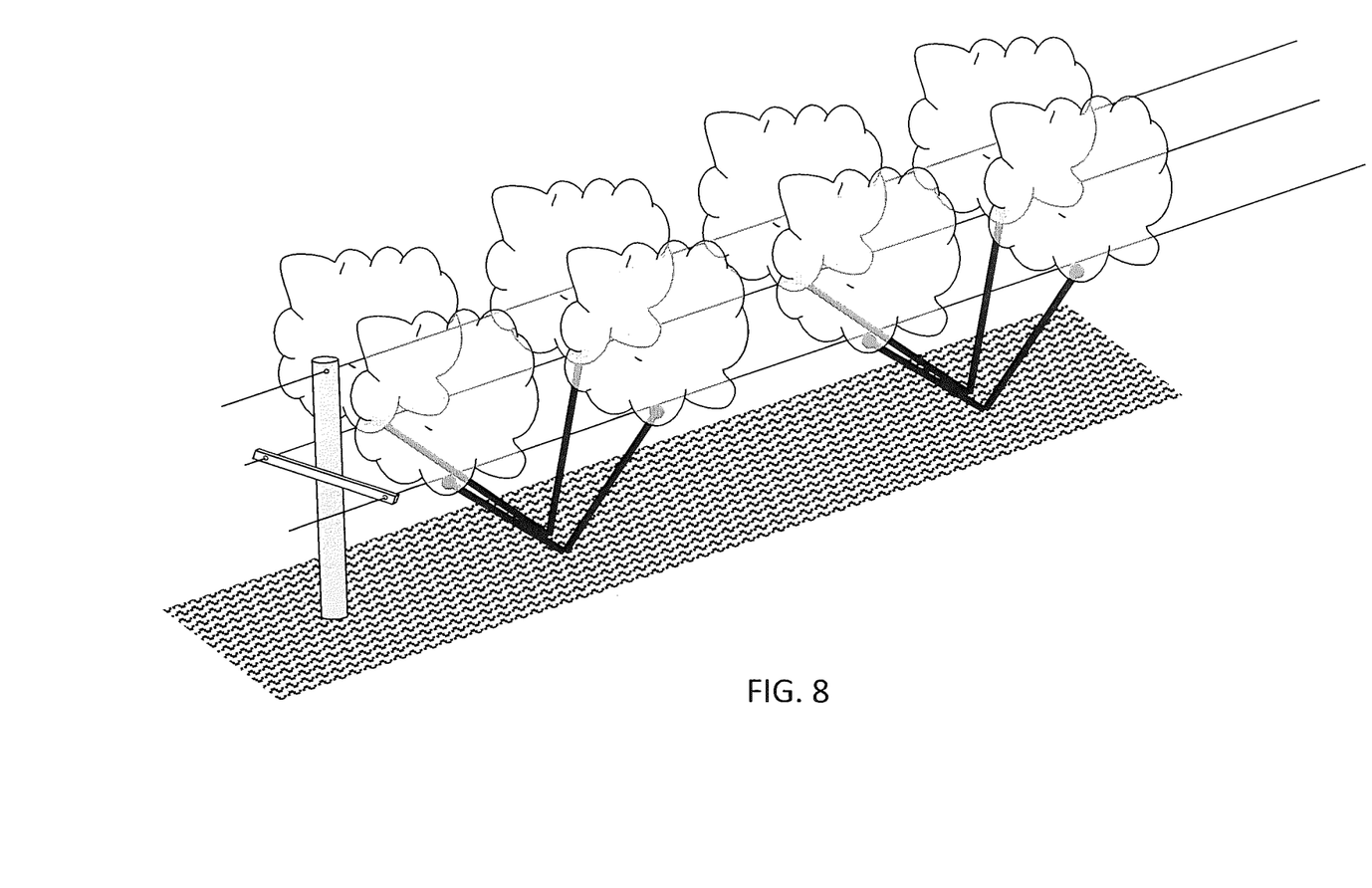
FIG. 8 illustrates an double curtain clustering managed according to embodiments of the present invention.

FIG. 8 shows four-vine clusters managed with an embodiment of the invention where the vine heads are in the same positions as those in FIG. 7. The vines here would benefit from root-zone clustering and would retain essentially the canopy structure of a Lyre system that is commonly maintained with standard vineyard equipment. Note, for simplicity, the training and support rods have been omitted from these latter two figures.

To date, the experiments with root-zone clustering have focused on plants supported primarily with irrigation water. Therefore, water availability could be varied while keeping other natural variables constant. However, the water-use effectiveness advantage of clustered root-zones as disclosed herein would also apply to plants whose water is supplied in whole or in part by rain. Embodiments would significantly reduce the need for supplemental irrigation and could allow successful farming in drier years from areas when irrigation is not allowed (for example, some regions, primarily in Europe, have local regulations that limit or prohibit wine grape irrigation).

Thus, a number of embodiments have been fully described above with reference to the drawing figures. Other details of the embodiments of the invention should be readily apparent to one skilled in the art from the drawings. Although the invention has been described based upon these embodiments, it would be apparent to those skilled in the art that certain modifications, variations, and alternative constructions would be apparent, while remaining within the spirit and scope of the invention. For example, while two-vine and three-vine clusters have been described for a single curtain row structure, clusters involving more than three vines are also possible. Similarly, for double curtain row structures, clusters involving more than four vines are possible. Also, for the embodiment of FIG. 2, where a row-structure was not employed, other types of geometries or spacing is possible, such as a rectangular arrangement of plants with more or less spacing between the root-zones and/or the canopies. Further, the particular separation measurements mentioned in the embodiments are only exemplary. Others are possible. In addition, the aboveground training systems in the embodiments are only exemplary. Others, including those with and without trellis wires, are possible. The key is locating plants so that their belowground root-zones are relatively close and then training them so that their aboveground canopies are relatively further apart. This provides improved water use effectiveness and other benefits while retaining the required aboveground spacing. These and other modifications of the present invention are intended to be within the scope of the appended claims.

What is claimed is:

1. A method of training plants comprising:
   planting a first plant and a second plant;
   wherein the first plant grows to have a first root-zone and a first canopy and the second plant grows to have a second root-zone and second canopy;
   training the first and second plants to horizontally offset their respective first and second canopies from their respective first and second root-zones;
   wherein a center of the first canopy and a center of the second canopy are further from each other than a center of the first root-zone and a center of the second root-zone are from each other.

2. The method of training plants of claim 1, wherein a distance between a center of the first root-zone and the second root-zone is less than half a distance between a center of the first canopy and a center of the second canopy.

3. The method of training plants of claim 1, wherein a distance between a center of the first root-zone and the second root-zone is less than one foot.

4. The method of training plants of claim 1, wherein the first root-zone and the second root-zone substantially overlap.

5. The method of training plants as claimed in claim 1, wherein planting the first and second plants comprises planting the first and second plants in a first row of plants such that the first plant grows to have a first trunk, and the second plant grows to have a second trunk, the method further comprising:
   installing a first training rod to train the first trunk and a second training rod to train the second trunk, respectively, wherein the first and second training rods are angled such that the first and second canopies are horizontally offset from the first and second root-zones.

6. The method of training plants of claim 5, wherein a distance between a center of the first root-zone and the second root-zone is less than half a distance between a center of the first canopy and a center of the second canopy.

7. The method of training plants of claim 5, wherein a distance between a center of the first root-zone and the second root-zone is less than one foot.

8. The method of training plants of claim 5, wherein the first root-zone and the second root-zone substantially overlap.

9. The method of training plants of claim 5, further comprising installing a trellis wire, wherein the trellis wire extends between the first end-post and the second end-post.

10. The method of training plants of claim 9, wherein a distance between a center of the first root-zone and the second root-zone is less than half a distance between a center of the first canopy and a center of the second canopy.

11. The method of training plants of claim 9, wherein a distance between a center of the first root-zone and the second root-zone is less than one foot.

12. The method of training plants of claim 9, wherein a distance between a center of the first root-zone and the second root-zone is less than six inches.

13. The method of training plants of claim 9, wherein the first root-zone and the second root-zone substantially overlap.

14. The method of training plants of claim 9, further comprising:
   planting a second row of plants parallel to the first row, wherein the second row of plants includes a third plant and a fourth plant, wherein the third plant grows to have a third canopy and a third root-zone, and the fourth plant grows to have fourth canopy and a fourth root-zone; and training the first, second, third and fourth plants to horizontally offset their respective canopies from their respective root-zones such that the distance between the centers of the canopies of any pair of plants is greater than twice the distance between centers of their respective root-zones.

15. The plant management method of claim 14, wherein the center of the root-zone of each plant of the first, second, third and fourth plants is within at most one foot of the center of the root-zone of another plant of the first, second, third and fourth plants.

16. The plant management method as claimed in claim 1, wherein planting the first and second plants comprises planting at least three plants in a cluster, each plant of the at least three plants located within two feet of at least two other plants of the at least three plants, wherein each plant of the at least three plants grows to have respective root-zones and canopies, and wherein training the first and second plants to horizontally offset their respective first and second canopies from their respective first and second root-zones comprises training each plant of the at least three plants to horizontally offset the center of its canopy from the center of its root-zone such that the distance between the center of its canopy and the center of the nearest canopy of another plant of the at least three plants is greater than twice the distance between a center of its root-zone and a center of the another plant of the at least three plants.

17. The plant management method of claim 16, wherein the center of the root-zone of each plant of the at least three plants is within at most one foot of the center of the root-zone of another plant of the at least three plants.

18. The plant management method of claim 16, wherein the root-zone of each plant of the at least three plants substantially overlaps with the root-zone of at least another of the at least three plants.

19. A method of training plants as claimed in claim 1, wherein planting the first and second plants comprises planting the first and second plants in a first row of plants such that the first plant grows to have a first trunk, and the second plant grows to have a second trunk, the method further comprising:

training the first trunk and the second trunk to be angled along the first row of plants, wherein the first and second canopies are horizontally offset from the first and second root zones.

20. The method of training plants of claim 19, wherein a distance between a center of the first root-zone and the second root-zone is less than half a distance between a center of the first canopy and a center of the second canopy.

21. The method of training plants of claim 19, wherein a distance between a center of the first root-zone and the second root-zone is less than one foot.

* * * * *